(12) United States Patent  
Stenson

(10) Patent No.: US 9,548,612 B2  
(45) Date of Patent: Jan. 17, 2017

(54) PARALLELING MODULE FOR A GENERATOR SYSTEM

(71) Applicant: Kohler Co., Kohler, WI (US)

(72) Inventor: Chad Stenson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 246 days.

(21) Appl. No.: 13/630,367

(22) Filed: Sep. 28, 2012

(65) Prior Publication Data

US 2014/0091632 A1    Apr. 3, 2014

(51) Int. Cl.
*H02J 3/38* (2006.01)
*H02J 4/00* (2006.01)

(52) U.S. Cl.
CPC ............... *H02J 3/381* (2013.01); *H02J 4/00* (2013.01); *Y10T 307/724* (2015.04)

(58) Field of Classification Search
CPC .......... H02J 3/381; H02J 4/00; Y10T 307/724
USPC .......................................................... 307/85
See application file for complete search history.

(56) References Cited

U.S. PATENT DOCUMENTS

| | | |
|---|---|---|
| 4,233,555 A | 11/1980 | Roche |
| 4,405,892 A | 9/1983 | Staerzl |
| 4,631,455 A | 12/1986 | Taishoff |
| 5,252,905 A | 10/1993 | Wills et al. |
| 5,552,954 A | 9/1996 | Glehr |
| 5,625,276 A | 4/1997 | Scott et al. |
| 5,694,027 A | 12/1997 | Satake et al. |
| 5,886,890 A | 3/1999 | Ishida et al. |
| 6,624,617 B2 | 9/2003 | Holzer et al. |
| 6,657,416 B2 * | 12/2003 | Kern ........................ H02J 9/066 290/40 A |
| 7,453,240 B2 | 11/2008 | Yamauchi et al. |
| 7,492,051 B1 | 2/2009 | Chung |
| 7,550,953 B2 | 6/2009 | Shah |
| 7,554,303 B1 | 6/2009 | Kawamura |

(Continued)

FOREIGN PATENT DOCUMENTS

| | | |
|---|---|---|
| EP | 1006641 A2 | 6/2000 |
| WO | WO-2008/040003 | 4/2008 |

OTHER PUBLICATIONS

"European Application No. 13184361.7, Extended European Search Report dated Aug. 21, 2014", (Aug. 21, 2014), 9 pgs.

(Continued)

*Primary Examiner* — Rexford Barnie
*Assistant Examiner* — Daniel Kessie
(74) *Attorney, Agent, or Firm* — Schwegman Lundberg & Woessner, P.A.

(57) ABSTRACT

Some embodiments relate to an example power management system. The power management system includes a first enclosure and a second enclosure. A first generator is inside the first enclosure and a second generator is inside the second enclosure. The power management system further includes a paralleling enclosure and a paralleling module inside the paralleling enclosure. The paralleling module includes at least one switching device within the paralleling enclosure to electrically connect the first generator to the second generator. The paralleling enclosure further includes a plurality of connectors that permit electrical connection between the paralleling module and the first generator, the second generator and an output without opening the paralleling enclosure.

17 Claims, 2 Drawing Sheets

(56) References Cited

U.S. PATENT DOCUMENTS

| | | | |
|---|---|---|---|
| 7,939,962 B2* | 5/2011 | Foch | H02J 1/10 307/19 |
| 8,129,863 B2* | 3/2012 | Eguchi | H02H 3/12 307/86 |
| 2003/0122360 A1* | 7/2003 | Badr | B60P 3/00 280/789 |
| 2006/0244327 A1 | 11/2006 | Kundel | |
| 2007/0262661 A1 | 11/2007 | Ai | |
| 2010/0007207 A1* | 1/2010 | Peuser | H02J 1/10 307/10.1 |
| 2011/0149624 A1 | 6/2011 | Yamanaka | |
| 2012/0007431 A1 | 1/2012 | Jang et al. | |
| 2012/0205986 A1* | 8/2012 | Frampton | H02J 3/381 307/84 |
| 2013/0113442 A1 | 5/2013 | Kawamura | |
| 2013/0119948 A1 | 5/2013 | Bekiarov | |
| 2013/0200699 A1 | 8/2013 | Origane et al. | |
| 2013/0293023 A1* | 11/2013 | Collie | H02J 3/46 307/84 |
| 2014/0001873 A1 | 1/2014 | Tian et al. | |
| 2015/0207326 A1 | 7/2015 | Stenson | |

OTHER PUBLICATIONS

"European Patent Office Application No. 13184361.7, Communication pursuant to Article 94(3) EPC dated Nov. 6, 2015", (Nov. 6, 2015), 6 pgs.

"European Patent Office Application No. 13184361.7, Extended European Search Report dated Sep. 2, 2014", (Sep. 2, 2014), 9 pgs.

\* cited by examiner

US 9,548,612 B2

PARALLELING MODULE FOR A GENERATOR SYSTEM

TECHNICAL FIELD

The present invention relates to a power generation system, and more particularly to a paralleling module for a power generation system.

BACKGROUND

Standby generators are often used to provide electrical power when power is unavailable from an electric utility company (e.g. during weather disturbances). In addition, standby generators are often used to provide electrical power at a remote location where utility company power is not available.

One type of standby electric generator comprises an internal combustion engine driving an electrical alternator that produces alternating electricity. Other types of standby electric generators include photovoltaic arrays and wind turbine generators.

When a situation may require large amounts of standby power, there can be advantages to employing multiple small generators rather than a single large generator. One of the advantages is that, if one generator fails or requires maintenance, a multi-generator system is still able to supply some power, which would not be with a single generator system.

In addition, if a situation requires greater capacity than what can be provided by an existing single generator system, then the single generator system can be readily turned into a multi-generator system by adding another generator. Adding a generator may be more desirable than bearing the cost of replacing a single generator with an even larger generator.

It should be noted that relatively larger generators often present difficulties in shipping and installation complexity. Therefore, by using several smaller generators the overall generator weight may be distributed over a broader area potentially avoiding the need for special strengthening of the supporting area (e.g. of a roof).

Traditionally, generator paralleling systems have been quite complex and often require several additional pieces of equipment to achieve satisfactory generator paralleling. As examples, existing systems may include separate synchronizers, load managers, and/or switch gear. In addition, traditional systems are not well suited to address mechanical and electrical load differences.

Therefore, a need exists for a power management system that is able to readily parallel multiple generators. In addition, these multi-generator systems that provide standby power should not require an extensive amount of additional equipment (and cost) in order to parallel multiple generators.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
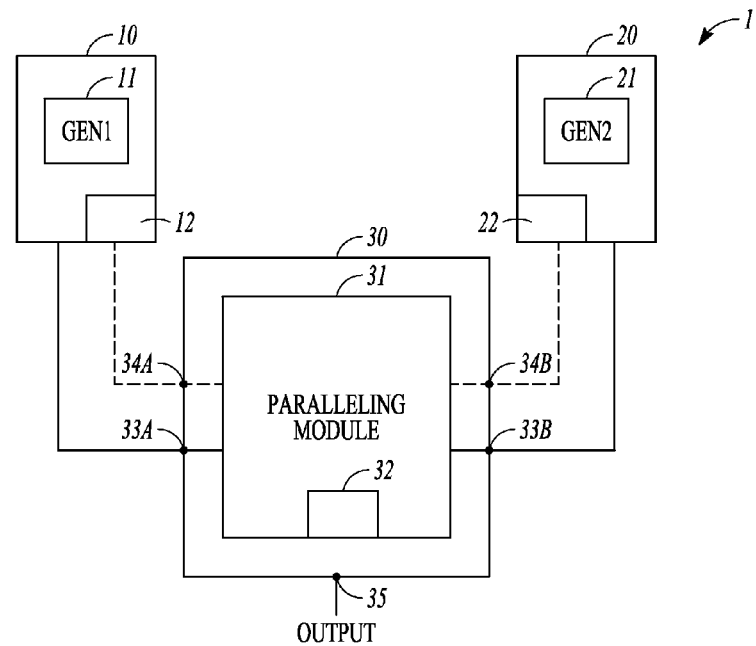
FIG. 1 is a schematic diagram showing an example paralleling module for a generator system.

FIG. 1 illustrates an example power management system 1. The power management system 1 includes a first enclosure 10 and a second enclosure 20. A first generator 11 is inside the first enclosure and a second generator 21 is inside the second enclosure 20.

The power management system 1 further includes a paralleling enclosure 30 and a paralleling module 31 inside the paralleling enclosure 30. The paralleling module 31 includes at least one switching device 32 within the paralleling enclosure 30 to electrically connect the first generator 11 to the second generator 21. The paralleling enclosure 30 further includes a plurality of connectors 33A, 33B, 35 that permit electrical connection between the paralleling module 31 and the first generator 11 (connector 33A), the second generator 21 (connector 33B) and an output (connector 35) without opening the paralleling enclosure 30.

In some embodiments, the first generator 11 includes a first generator controller 12 inside the first enclosure 10 and the second generator 21 includes a second generator controller 22 inside the second enclosure 20. As shown in FIG. 1, at least some plurality of connectors 34A, 34B on the paralleling enclosure 30 permit electrical connection between the paralleling module 31 and the first generator controller 12 (connector 34A) and the second generator controller 12 (connector 34B) without opening the paralleling enclosure 30. Embodiments are contemplated where the paralleling module 31 allows the first generator controller 11 and the second generator controller 21 to exchange signals.

Figure 2:
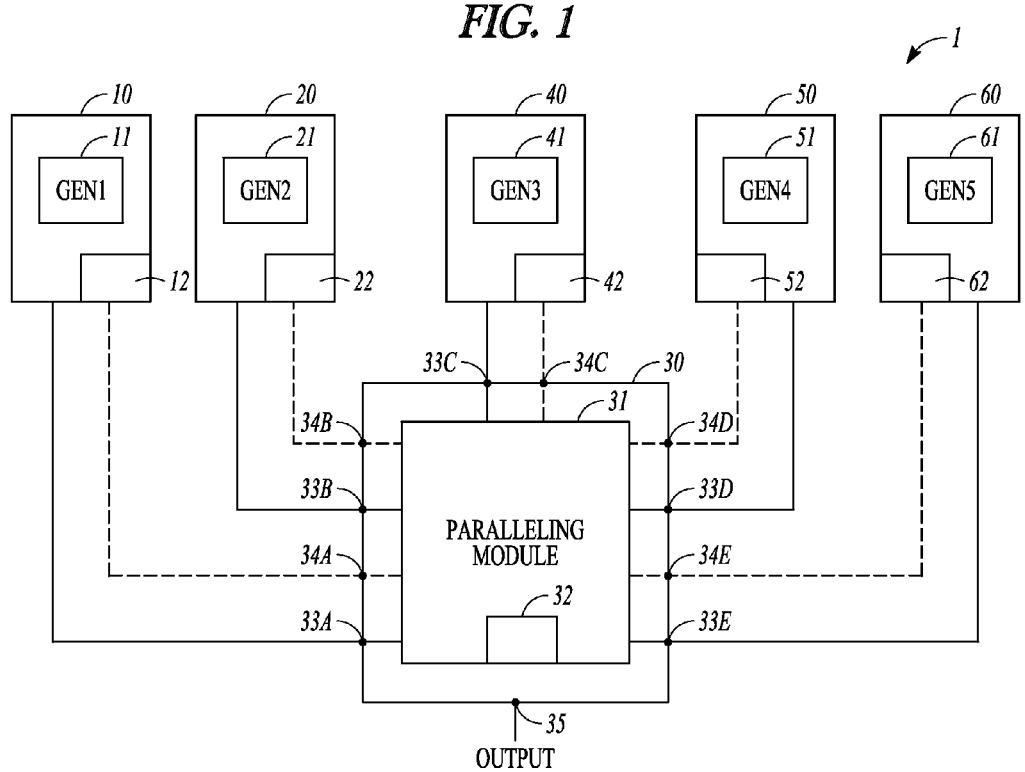
FIG. 2 is a schematic diagram showing the generator system of FIG. 1 where the generator system includes additional parallel generators.

FIG. 2 shows an example embodiment of the power management system 1 where the power management system 1 further includes a plurality of additional enclosures 40, 50, 60 and a plurality of additional generators 41, 51, 61 where each of the additional generators 41, 51, 61 is inside one of the additional enclosures 40, 50, 60. The at least one switching device 32 in the paralleling module 31 within the paralleling enclosure 30 may electrically connect the plurality of additional generators 41, 51, 61 with the first generator 11 and the second generator 12. In addition, the plurality of connectors 33C, 33D, 33E on the paralleling enclosure 30 may further permit electrical connection of the plurality of additional generators 41, 51, 61 with the first generator 11, the second generator 21 and the output without opening the paralleling enclosure 30.

In some embodiments, each of the additional generators 41, 51, 61 includes a generator controller 42, 52, 62 located inside one of the respective additional enclosures 40, 50, 60. At least some plurality of connectors 34C, 34D, 34E on the paralleling enclosure 30 permit electrical connection between each of the generator controllers 12, 22, 42, 52, 62 without opening the paralleling enclosure 30. As an example, the paralleling module 31 may allow each of the generator controllers 12, 22, 42, 52, 62 to exchange signals.

Figure 3:
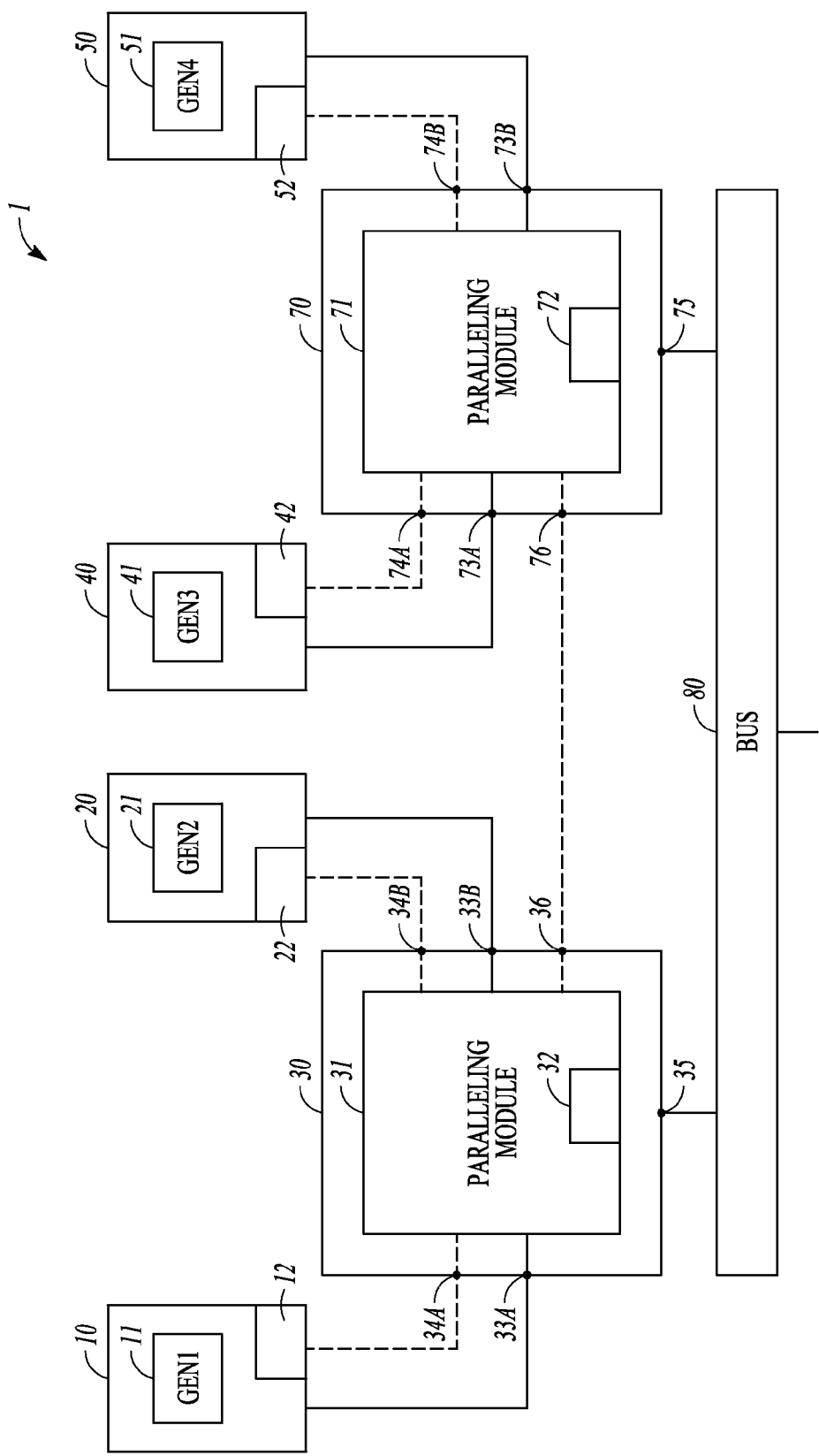
FIG. 3 is a schematic diagram showing the generator system of FIG. 1 where the generator system includes additional parallel generators and an additional paralleling module.

In the example embodiment that is shown in FIG. 3, the power management system 1 further includes a third enclosure 40 and a fourth enclosure 50. A third generator 41 is inside the third enclosure 40 and a fourth generator 51 inside the fourth enclosure 50. The power management system 1 further includes an additional paralleling enclosure 70 and an additional paralleling module 71 inside the additional paralleling enclosure 70.

The additional paralleling module 71 includes at least one switching device 72 within the additional paralleling enclosure 70 to electrically connect the third generator 41 to the fourth generator 51. The paralleling enclosure 70 further includes a plurality of connectors 73A, 73B, 75 that permit electrical connection between the paralleling module 71 and the third generator 41 (connector 73A), the fourth generator 51 (connector 73B) and an output (connector 75) without opening the additional paralleling enclosure 71.

In some embodiments, a bus 80 is electrically connected to the output of the paralleling module 31 and the output of the additional paralleling module 71. As an example, the bus 80 may selectively receive current from the paralleling module 31 and/or the additional paralleling module 71.

As shown in FIG. 3, the third generator 41 may include a third generator controller 42 inside the third enclosure 40 and the fourth generator 51 may include a fourth generator controller 52 inside the fourth enclosure 50. At least some of the plurality of connectors 74A, 74B on the additional paralleling enclosure 70 may permit electrical connection between the third generator controller 42 and the fourth generator controller 52 without opening the additional paralleling enclosure 70. As an example, the additional paralleling module 71 may allow the third generator controller 42 and the fourth generator controller 52 to exchange signals.

In some embodiments, at least one of the plurality of connectors 36 on the paralleling enclosure and at least one of the plurality of connectors 76 on the additional paralleling enclosure 70 permit electrical connection between the paralleling module 31 and the additional paralleling module 71. Embodiments are contemplated where the power management system 1 includes additional connectors on the paralleling enclosure 30 and additional connectors on the additional paralleling enclosure 70 in order to permit a variety of electrical connections between the generators, generator controllers and/or paralleling modules.

It should be noted that the size, type, number and location of the generators, generator controllers, paralleling modules and connectors may vary depending on the application where the power management system 1 is to be used (among other factors). In addition, the need for the paralleling modules to pass communications (i.e., signals) to one another will depend in part on the application where the power management system 1 is to be used (among other factors).

One example type of generator that may be utilized in the power management system 1 includes an internal combustion engine that drives an electrical alternator to produce alternating electricity. The internal combustion engine and the electrical alternator are housed inside an enclosure that protects the internal combustion engine and the electrical alternator from the environment where the generator is located.

The power management system 1 described herein may be able to readily parallel multiple generators. The power management system 1 may also be able to parallel multiple generators without requiring an extensive amount of additional equipment (and cost) in order to parallel multiple generators.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
a first enclosure;
a first generator inside the first enclosure;
a second enclosure;
a second generator inside the second enclosure;
a paralleling enclosure; and
a paralleling module inside the paralleling enclosure, wherein the paralleling module includes at least one switching device within the paralleling enclosure to electrically connect the first generator to the second generator, wherein an outer surface of the paralleling enclosure further includes a plurality of connectors that permit electrical connection between the paralleling module and the first generator, the second generator and an output without opening the paralleling enclosure;
a third enclosure;
a third generator inside the third enclosure;
a fourth enclosure;
a fourth generator inside the fourth enclosure;
an additional paralleling enclosure; and
an additional paralleling module inside the additional paralleling enclosure,
wherein the additional paralleling module includes at least one switching device within the additional paralleling enclosure to electrically connect the third generator to the fourth generator, wherein an outer surface of the paralleling enclosure further includes a plurality of connectors that permit electrical connection between the paralleling module and the third generator, the fourth generator and an output without opening the additional paralleling enclosure;
a bus that is electrically connected to the output of the paralleling module and the output of the additional paralleling module such that the bus selectively receives current from the paralleling module and the additional paralleling module; and
wherein the paralleling module is electrically connected to the additional paralleling module via the bus and another conductor.

2. The power management system of claim 1, wherein the first generator includes a first generator controller inside the first enclosure and the second generator includes a second generator controller inside the second enclosure, wherein at least some plurality of connectors on the outer surface of the paralleling enclosure permit electrical connection between the paralleling module and the first generator controller and the second generator controller without opening the paralleling enclosure.

3. The power management system of claim 2, wherein the paralleling module allows the first generator controller and the second generator controller to exchange signals.

4. The power management system claim 1 further comprising:
a plurality of additional enclosures;
a plurality of additional generators, wherein each of the additional generators is inside one of the additional enclosures; and
wherein the at least one switching device in the paralleling module within the paralleling enclosure electrically connects the plurality of additional generators with the first generator and the second generator, wherein the plurality of connectors on the outer surface of the paralleling enclosure further permits electrical connection of the plurality of additional generators with the first generator, the second generator and the output without opening the paralleling enclosure.

5. The power management system of claim 4, wherein each of the additional generators includes a generator controller located inside one of the respective additional enclosures, and wherein at least some plurality of connectors on the outer surface of the paralleling enclosure permit electrical connection between each of the generator controllers without opening the paralleling enclosure.

6. The power management system of claim 5, wherein the paralleling module allows each of the generator controllers to exchange signals.

7. The power management system of claim 1, wherein the third generator includes a third generator controller inside the third enclosure and the fourth generator includes a fourth generator controller inside the fourth enclosure, wherein at least some plurality of connectors on the outer surface of the additional paralleling module permit electrical connection between the third generator controller and the fourth generator controller without opening the additional paralleling enclosure.

8. The power management system of claim 7, wherein the additional paralleling module allows the third generator controller and the fourth generator controller to exchange signals.

9. The power management system of claim 1, wherein at least one of the plurality of connectors on the outer surface of the paralleling enclosure and at least one of the plurality of connectors on the outer surface of the additional paralleling enclosure permit electrical connection between the paralleling enclosure and the additional paralleling enclosure.

10. The power management system of claim 1, wherein the paralleling module enclosure and the additional paralleling module enclosure are configured to exchange signals.

11. A generator paralleling system comprising:
an enclosure; and
a paralleling module inside the enclosure, wherein the paralleling module includes at least one switching device within the enclosure to electrically connect a first generator to a second generator, wherein an outer wall of the enclosure further includes a plurality of connectors that permit electrical connection with the first generator, the second generator and an output without opening the enclosure;
an additional enclosure; and
an additional paralleling module inside the additional enclosure,
wherein the additional paralleling module includes at least one switching device within the additional enclosure to electrically connect a third generator to a fourth generator, wherein an outer wall of the additional enclosure further includes a plurality of connectors that permit electrical connection with the third generator, fourth generator and an output without opening the additional enclosure; and
a bus that is electrically connected to the at least one switching device in the paralleling module and the at least one switching device in the additional paralleling module such that bus selectively receives current from the paralleling module and the additional paralleling module; and
wherein at least one of the plurality of connectors on the enclosure is electrically connected to at least one of the plurality of connectors on the additional enclosure.

12. The generator paralleling system of claim 11, wherein at least some plurality of connectors on the paralleling enclosure permit electrical connection with a first generator controller that operates the first generator and a second generator controller that operates the second generator without opening the enclosure, wherein the paralleling module allows the first generator controller and the second generator controller to exchange signals.

13. The generator paralleling system of claim 11, wherein the at least one switching device in the paralleling module within the paralleling enclosure electrically connects a plurality of additional generators with the first generator and the second generator, wherein the plurality of connectors on the outer wall of the enclosure further permit electrical connection of the plurality of additional generators with the first generator, the second generator and an output without opening the enclosure.

14. The generator paralleling system of claim 13, wherein at least some plurality of connectors on the outer wall of the enclosure permit electrical connection with generator controllers that operate each of the respective additional generators without opening the enclosure.

15. The generator paralleling system of claim 14, wherein the paralleling module allows each of the generator controllers to exchange signals.

16. The generator paralleling system of claim 11, wherein at least some plurality of connectors on the outer wall of the additional enclosure permit electrical connection with a third generator controller that operates the third additional generator and a fourth generator controller that operates the fourth additional generator without opening the additional enclosure, and wherein the additional paralleling module allows the third generator controller and the fourth generator controller to exchange signals.

17. The generator paralleling system of claim 11, wherein the paralleling module enclosure and the additional paralleling module enclosure are configured to exchange signals.

* * * * *